Figure 1:
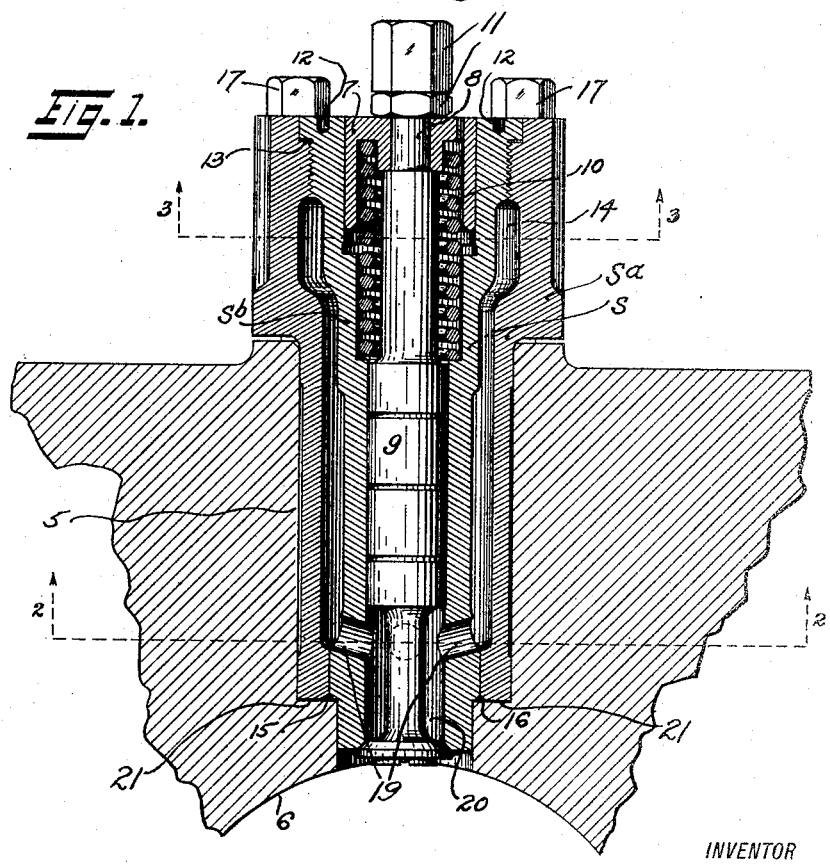

G. C. DAVISON.
AIR STARTING VALVE FOR DIESEL ENGINES.
APPLICATION FILED APR. 3, 1916.

1,204,952.

Patented Nov. 14, 1916.
2 SHEETS—SHEET 1.

G. C. DAVISON.
AIR STARTING VALVE FOR DIESEL ENGINES.
APPLICATION FILED APR. 3, 1916.

1,204,952.

Patented Nov. 14, 1916.
2 SHEETS—SHEET 2.

INVENTOR
G. C. Davison,
BY
ATTORNEYS.

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

AIR-STARTING VALVE FOR DIESEL ENGINES.

1,204,952. Specification of Letters Patent. Patented Nov. 14, 1916.

Application filed April 3, 1916. Serial No. 88,557.

*To all whom it may concern:*

Be it known that I, GREGORY C. DAVISON, a citizen of the United States, residing at New London, in the county of New London and State of Connecticut, have invented certain new and useful Improvements in Air-Starting Valves for Diesel Engines; and I do hereby declare the following to be a full, clear, and exact description of the invention, such as will enable others skilled in the art to which it appertains to make and use the same.

This invention relates to internal combustion engines, and more particularly to air starting valves for use in supplying air to the cylinders of such an engine.

The object of the invention is to provide a valve of this character of an improved construction with which reliable and efficient operation is obtained, which permits of convenient re-grinding of the valve surfaces and with which a simplification of the construction of the cylinder is effected.

The invention involves the provision of a valve consisting of a valve cage formed by two tubular members fitting one within the other and forming a chamber between them, and a valve stem movable within the inner tubular member and carrying a valve disk which controls the outlet from the valve. The outer tubular member is provided with a transverse opening leading through the wall thereof near the outer end of the valve cage, through which opening air passes from the air conduit to the chamber between the two members of the valve cage. This chamber extends practically throughout the length of the valve cage and at the inner end of the valve the outlet for the air from the valve to the interior of the cylinder is controlled by the valve disk. The disk is mounted on the valve stem and a portion of the latter is formed to provide a piston whereby the air pressure is made to balance the valve in the closed position. The valve is provided with a spring which is housed within the inner tubular member and which serves to restore the valve to the closed position after it has been moved from that position by a cam.

With this construction of valve a number of important advantages are secured. One of these is that the construction of the cylinder necessary for the reception of the valve is greatly simplified, particularly in that it is not necessary to provide air passages in the cylinder casting such as would require the use of a core during the casting operation or a difficult boring operation thereafter. Instead, the cylinder casting is merely provided with a cylindrical well or opening into which the valve fits. Air is led to the valve at a point outside the cylinder casting and passes through the transverse opening in the outer tubular member to the chamber between the two tubular members of the valve cage. This chamber extends to a point adjacent to the inner end of the valve cage and the flow of the air from the chamber to the interior of the cylinder is controlled by the movable valve-member.

Another important advantage characteristic of the construction constituting the present invention is that the work of grinding the valve-member and valve seat is greatly facilitated. This member and its seat are located at the inner end of the valve cage so that they are rendered accessible from the interior of the cylinder or, by disconnecting the valve from the cylinder casting and removing it from its opening therein, the valve-member and seat may then be readily ground and the parts then restored to their initial positions.

Another advantage attained by the use of the construction above indicated is that the parts of the valve may be readily assembled and when assembled there is little danger of any of them becoming displaced so as to cause faulty operation of the valve. The two tubular members constituting the valve cage are preferably provided with co-acting threads adjacent to the outer end of the valve cage, and these two members are secured together merely by these threads; there being no air passages through them which require accurate registry or registry of such passages with corresponding passages in the cylinder casting, the work of assembling the parts may be readily performed and if desired after the two tubular members have been positioned relatively, they may be secured together permanently, as by means of welding them.

These and other features of the invention will be better understood by reference to the following description taken in connection with the accompanying drawings which illustrate a preferred embodiment of the invention.

Figure 2:
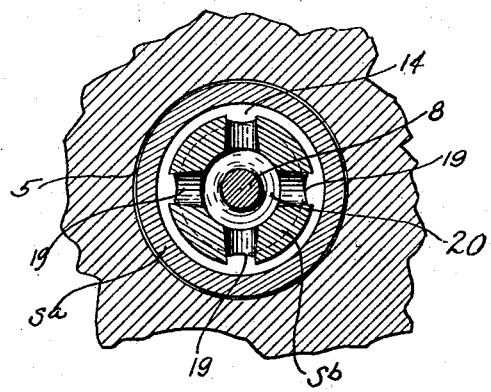
Figure 3:
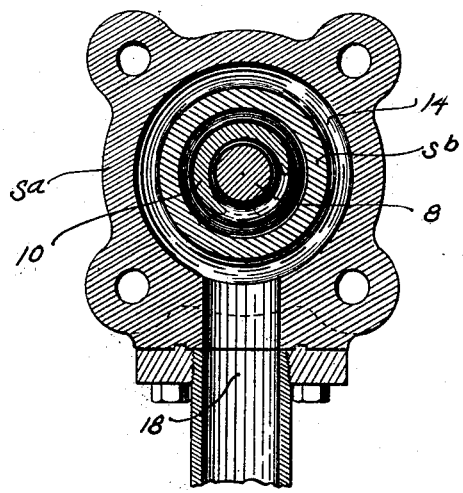

In these drawings: Figure 1 is an axial sectional view of the valve; Figs. 2 and 3 are transverse sections taken on lines 2—2 and 3—3 respectively of Fig. 1, and Fig. 4 is a top view of the valve shown in Fig. 1.

Referring to Fig. 1, the construction illustrated includes a valve cage consisting of inner and outer tubular members which are secured together and are formed to provide a chamber between them. This valve cage is represented by the reference S and the two tubular members thereof are indicated by $S^a$ and $S^b$. The valve cage consisting of these two parts is adapted to be inserted within an opening or well provided in the cylinder casting. This well is indicated by the reference 5 and the interior wall of the cylinder casting is indicated at 6. The two tubular members are of substantially the same length and one fits within the other; near their outer ends they are provided with coacting threads whereby they may be secured together in the manner indicated in Fig. 1. In assembling the two tubular members a gasket is preferably provided between coacting shoulders thereon as is shown at 13 in Fig. 1. Intermediate their ends these two tubular members are formed to provide an annular air chamber 14 between them, extending from a point adjacent to the outer end of the valve to a point adjacent to the inner end of the valve. Near the inner end of the valve beyond the chamber between the two tubular members, the latter are of such size that the inner one fits snugly within the outer one. At the end of the chamber near the inner end of the valve, transverse passages 19 are provided extending through the inner tubular member so that air may flow from the chamber between the two members to the interior of the inner member at a point adjacent to the inner end of the valve.

Within the inner tubular member $S^b$ is a valve stem 8, a portion of which is enlarged to form a piston 9 which makes a close sliding fit within the central opening in the member $S^b$. Below this piston the stem is of smaller diameter from a point above the passages 19 to the lower end of the valve, and on the lower end of the stem is secured the valve-member which coacts with a seat formed upon the lower end of the inner tubular member $S^b$. This valve-member is normally held upon its seat by a spring 10 which is coiled about the upper portion of the valve stem 8 and is housed within the inner tubular member $S^b$. One end of this spring bears upon a transverse wall formed by the enlargement of the central opening in the inner tubular member $S^b$ and the other end of the spring bears upon a cap 7 which is adapted to reciprocate within the bore of the tubular member $S^b$. This cap 7 has a central opening through which the stem 8 extends, and the cap is secured upon the stem by means of nuts 11 which are threaded upon the stem. The cap 7 is of the cross-sectional shape shown in Fig. 1, from which it will be seen that the cap is formed to embrace the end of the spring 10 so as to center the spring accurately with relation to the valve stem.

In assembling the parts, the inner tubular member is threaded in the outer one and the gasket 13 placed in position between them, so that a tight joint is formed between these two parts. To facilitate this relative adjustment of the parts, openings 12 are preferably provided in the upper end of the inner tubular member for the reception of a special tool, by means of which the inner member may be turned relatively to the outer one. If desired, the two tubular members may be welded together after they have been properly positioned relatively. Such welding is indicated at 15 and 16. This is possible because the construction of the valve makes is unnecessary to provide for access to the interior of the valve structure other than that which can be obtained by removal of the valve stem.

The valve is mounted in position by inserting the inner end thereof into the well or opening provided in the cylinder casting. Prior to doing so, a gasket 21 is positioned upon a transverse wall in the opening in the cylinder casting, as is shown in Fig. 1. The valve is secured in position by means of bolts 17 passing through the outer tubular member $S^a$ and entering threaded openings provided therefor in the cylinder casting. The air conduit leading to the valve is then connected to the transverse passage 18 and air enters through this passage to the chamber 14, the passages 19 in the inner tubular member, and the space 20 above the valve-member. The pressure of this air upon the lower end of piston 9 and the upper end of the valve-member substantially balances the valve, and the latter may be opened by a cam as is usual in such engines, this cam acting upon the upper end of the stem or the nuts 11 secured thereto, and after the valve has been opened it is returned to the closed position by spring 10.

I claim:

1. An air-starting valve comprising the combination of a valve-cage consisting of inner and outer tubular members fitting one within the other and forming a chamber between them, a passage through the outer member near the outer end of the valve cage and leading to said chamber, a valve-stem adapted to reciprocate within the inner member, a spring actuating the stem, and a valve member on the stem controlling the outlet at the inner end of the valve-cage for air flowing through said passage and chamber; substantially as described.

2. An air-starting valve comprising the combination of a valve-cage consisting of inner and outer tubular members fitting one within the other and forming a chamber between them, a passage through the outer member near the outer end of the valve-cage and leading to said chamber, a passage through the inner member near the inner end of the valve-cage and leading from said chamber to the interior of the inner member, a valve-stem adapted to reciprocate within the inner member, a spring actuating the stem, and a valve member on the stem movable therewith to and from a seat on the inner end of the inner tubular member to control the flow of air through the valve; substantially as described.

3. An air-starting valve comprising the combination of a valve-cage consisting of inner and outer tubular members fitting one within the other and forming a chamber between them; a passage through the outer member near the outer end of the valve-cage and leading to said chamber, a valve-stem adapted to reciprocate within the inner member, a spring housed within the inner tubular member and adapted to actuate the valve-stem, and a valve member on the valve-stem controlling the outlet at the inner end of the valve-cage for air flowing through said chamber and passage, substantially as described.

4. An air-starting valve comprising the combination of a valve-cage consisting of inner and outer tubular members fitting one within the other and forming a chamber between them, a passage through the outer member near the outer end of the valve-cage and leading to said chamber, a passage through the inner member near the inner end of the valve-cage and leading from said chamber to the interior of the inner tubular member, a valve-stem adapted to reciprocate within the inner member, a spring coiled about the valve-stem and located within the inner tubular member, and a valve member on the valve-stem movable therewith to and from a seat upon the inner end of the inner tubular member; substantially as described.

5. An air-starting valve comprising the combination of a valve-cage consisting of inner and outer tubular members fitting one within the other and forming a chamber between them, a passage through the outer member near the outer end of the valve-cage and leading to said chamber, a piston adapted to reciprocate within the inner tubular member and having its inner end exposed to the air pressure existing within the valve-cage near the inner end thereof, a spring for moving the piston in the direction of its axis, and a valve member movable with the piston and controlling the outlet at the inner end of the valve-cage for air flowing through said passage and chamber; substantially as described.

6. An air-starting valve comprising the combination of a valve-cage consisting of inner and outer tubular members fitting one within the other and forming a chamber between them, a passage through the outer member near the outer end of the calve-cage and leading to said chamber, a valve-stem adapted to reciprocate within the inner member, a cap secured to the valve-stem and adapted to reciprocate with the stem within the inner tubular member, a spring for actuating the valve-stem coiled about the stem and bearing at one end upon said cap and at the other end upon a wall on the interior of the inner tubular member, and a valve member movable with the stem and controlling the outlet at the inner end of the valve-cage for air flowing through said passage and chamber; substantially as described.

7. An air-starting valve comprising the combination of a valve-cage consisting of inner and outer tubular members fitting one within the other and forming a chamber between them, a passage through the outer member near the outer end of the valve-cage and leading to said chamber, a valve-stem adapted to reciprocate within the inner member, a cap secured to the valve-stem and adapted to reciprocate with the stem within the inner tubular member, a spring for actuating the valve-stem coiled about the stem and bearing at one end upon said cap and at the other end upon a wall on the interior of the inner tubular member, said cap being formed to embrace the end of the spring to center the spring with relation to the valve-stem, and a valve member movable with the stem and controlling the outlet at the inner end of the valve-cage for air flowing through said passage and chamber; substantially as described.

8. An air-starting valve comprising the combination of a valve-cage consisting of inner and outer tubular members fitting one within the other and forming a chamber between them, a passage through the outer member near the outer end of the valve-cage and leading to said chamber, a passage through the inner member near the inner end of the valve-cage and leading from said chamber to the interior of the inner member, a piston adapted to reciprocate within the inner tubular member and having its inner end exposed to the air pressure existing within the inner tubular member near the inner end thereof, a spring for moving the piston in the direction of its axis, and a valve member movable with the piston to and from a seat upon the inner end of the inner tubular member; substantially as described.

9. An air-starting valve comprising the combination of a valve-cage consisting of inner and outer tubular members fitting one within the other and forming a chamber between them, a passage through the outer member near the outer end of the valve-cage and leading to said chamber, a passage through the inner member leading from the chamber to the interior of the inner member, a valve stem adapted to reciprocate within the inner member, a cap secured to the valve stem and adapted to reciprocate with the same within the inner tubular member, a spring for actuating the valve stem coiled about the stem and bearing at one end upon said cap and at the other end upon a wall on the interior of the inner tubular member, and a valve member movable with the stem toward and away from a seat upon the inner end of the inner tubular member; substantially as described.

10. An air-starting valve comprising the combination of a valve-cage consisting of two tubular members fitting one within the other and formed to provide coacting surfaces near their inner and outer ends and a chamber between the two members intermediate the coacting surfaces, the said coacting surfaces at one end of the valve being threaded, a transverse passage through the outer member leading to said chamber near the outer end of the valve, a transverse passage through the inner member leading from the chamber to the interior of the inner member, a spring actuated valve stem adapted to reciprocate within the inner tubular member, and a valve member movable with the stem toward and away from a seat upon the inner end of the inner tubular member; substantially as described.

In testimony whereof I affix my signature.

GREGORY C. DAVISON.

Copies of this patent may be obtained for five cents each, by addressing the "Commissioner of Patents, Washington, D. C."